Patented Jan. 26, 1926.

1,570,763

UNITED STATES PATENT OFFICE.

ADOLPH MILLER, OF KIRKWOOD, MISSOURI.

METALLIC COMPOSITION AND METHOD OF MAKING THE SAME.

No Drawing.    Application filed July 19, 1924. Serial No. 726,940.

*To all whom it may concern:*

Be it known that I, ADOLPH MILLER, a citizen of the United States, and resident of the city of Kirkwood, county of St. Louis, and State of Missouri, have invented new and useful Improvements in Metallic Compositions and Methods of Making the Same, of which the following is a specification containing a full, clear, and exact description thereof.

My invention relates to improvements in metallic compositions or alloys and method of making the same and has for its primary object the production of a metal especially adapted for making storage battery plates.

My improved composition of metal or alloy is made of about 90 per cent pure lead, and about 10 per cent of redistilled mercury, by weight.

In making my composition I take lead and melt it in any suitable closed receptacle which is provided with a removable cover, and I also take the mercury and heat in a separate closed vessel to the boiling point, and then I conduct the heated mercury into the melted lead, in a way not to let gas escape. While the mercury is being mixed with the lead, sufficient heat is maintained to keep the mixture of lead and mercury up to the boiling point of mercury, this mixture being constantly agitated so as to thoroughly mix the two together.

In the actual practice of my process I maintain the mixture of lead and mercury at the boiling point of mercury from five to fifteen minutes.

After the composition has been prepared in this manner, the mixture is drawn off, after its temperature has dropped below the boiling point of mercury, into molds and allowed to cool.

The nature of the metal thus formed is very porous, although malleable and ductile. it has a great rigidity and stiffness and has a very high conductivity for electricity. In fact it has practically the same conductivity as copper and is a great deal cheaper, and has a higher fusion point than lead, and does not oxidize as readily as lead.

I have found by experiments that this metal or composition is especially adapted for the making of storage battery plates on account of its great porosity over lead itself, its great electric conductivity, its rigidity and it being practically non-corrosive. Battery plates made out of this metal are practically immune from the electrolytic action of the cell.

When my metal is formed and made into and used for electric storage battery plates, I have found that the action of the acid and the electricity eliminates and precipitates to a great extent the mercury content of the metal thus leaving it in a high state of porosity without weakening the plate. The precipitated mercury can be recovered and used for any purpose desired.

In making my metal when used for other purposes than storage batteries and in which impurities in the metals do not impair its value, commercial grades of mercury and lead may be used instead of pure lead and redistilled mercury.

Having fully described my invention, what I claim is:—

1. A metallic composition composed of about 90 per cent lead and about 10 per cent mercury.

2. A metallic composition composed of lead and mercury.

3. The herein described method of making a metallic composition which consists in taking lead and melting it in a vessel, taking mercury and heating it to the boiling point in a separate vessel and then mixing the mercury and molten lead together and agitating the same, and simultaneously applying heat to said mixture to maintain the same to the boiling point of mercury during the mixing.

4. The herein described method of making metal which consists in taking pure lead and melting it in a separate vessel, taking mercury and heating it to the boiling point in another vessel, mixing the mercury and molten lead together and agitating the same, and applying heat to said mixture to maintain the same to the boiling point of mercury for from five to fifteen minutes, allowing the same to cool below the boiling point of mercury, and then pouring the same into molds.

5. The herein described method of making a metallic composition which consists in placing lead in a vessel, melting the same and heating it to the boiling point of mercury, agitating the molten lead, and during said agitation adding mercury thereto which has been heated to the boiling point, continuing the agitation of said mixture a predetermined length of time, and during said agitation maintaining the mixture at the boiling point of mercury, and lastly permitting said mixture to cool.

6. The herein described method of making a metallic composition which consists in taking by weight a ninety per cent (90%) of lead and ten per cent (10%) of mercury, heating the same to the boiling point of mercury, and then thoroughly mixing the same.

7. The herein described method of making a metallic composition which consists in heating lead and mercury in separate vessels to the boiling point of mercury, agitating the lead and during said agitation adding the mercury thereto, and then agitating the mixture and maintaining its temperature at the boiling point of mercury for a predetermined length of time.

In testimony whereof, I have signed my name to this specification.

ADOLPH MILLER.